United States Patent [19]

Yordan et al.

[11] Patent Number: 5,424,259
[45] Date of Patent: Jun. 13, 1995

[54] HIGH SOLIDS SLURRIES OF STRUCTURED KAOLIN CLAY MATERIALS HAVING IMPROVED HIGH SHEAR RHEOLOGY AND PROCESS FOR THE MANUFACTURE THEREOF

[75] Inventors: Jorge L. Yordan; David R. Collins, both of Sandersville, Ga.

[73] Assignee: Thiele Kaolin Company

[21] Appl. No.: 206,070

[22] Filed: Mar. 4, 1994

[51] Int. Cl.$^6$ .............................................. C04B 33/04
[52] U.S. Cl. ................................... 501/146; 106/416; 106/486; 501/149
[58] Field of Search ................... 106/416, 486, 487; 501/145, 146, 149

[56] References Cited

U.S. PATENT DOCUMENTS

| | | |
|---|---|---|
| 2,995,458 | 8/1961 | Murray . |
| 3,394,022 | 7/1968 | Lyons et al. ........................ 106/486 |
| 3,398,008 | 8/1968 | Jacobs et al. ........................ 501/147 |
| 3,586,523 | 6/1971 | Fanselow et al. . |
| 3,754,712 | 8/1973 | Cecil . |
| 4,017,324 | 4/1977 | Eggers . |
| 4,118,245 | 10/1978 | Hamill et al. . |
| 4,118,246 | 10/1978 | Horzepa et al. ...................... 501/147 |
| 4,137,092 | 1/1979 | Cumpston ............................ 106/486 |
| 4,186,027 | 1/1980 | Bell et al. ............................ 501/147 |
| 4,309,222 | 1/1982 | Hoyt .................................... 501/147 |
| 4,374,203 | 2/1983 | Thompson et al. . |
| 4,462,808 | 7/1984 | Gross et al. . |
| 4,812,299 | 3/1989 | Wason . |
| 4,888,315 | 12/1989 | Bowman et al. ..................... 510/144 |
| 5,089,056 | 2/1992 | Shi et al. . |
| 5,152,835 | 10/1992 | Nemeh . |

OTHER PUBLICATIONS

Article from Tenside Surf. Det. 28, pp. 230–244; author–M. K. Nagarajan; "Deflocculation of Kaolinite Slurries", 1991 No month.

Article from TAPPI Journal, vol. 57, No. 5, pp. 96–100; author–M. E. Rothmann; "The Influence of Sodium Polyacrylate on the Properties of Coating Colors"; May 1974.

Paper presented at 1987 Annual Meeting of the American Institute of Mining Engineers; author–P. E. Richardson; "Dispersants in Mineral Processing Applications"; 1987 No month.

Primary Examiner—Mark L. Bell
Assistant Examiner—Michael Marcheschi
Attorney, Agent, or Firm—Jones & Askew

[57] ABSTRACT

A high solids structured kaolin clay slurry having improved high shear rheology is manufactured by a process which comprises the sequential steps of forming an aqueous composition by mixing water and a lithium-based dispersant and then mixing structured kaolin clay particles with the aqueous composition to form the desired high solids slurry.

21 Claims, No Drawings

HIGH SOLIDS SLURRIES OF STRUCTURED KAOLIN CLAY MATERIALS HAVING IMPROVED HIGH SHEAR RHEOLOGY AND PROCESS FOR THE MANUFACTURE THEREOF

TECHNICAL FIELD

This invention relates to a high solids slurry of a structured kaolin clay material wherein the slurry has improved high shear rheology and good opacifying characteristics. In a more specific aspect, this invention relates to a high solids slurry of calcined kaolin clay wherein the slurry has improved high shear rheology and good opacifying characteristics. This invention also relates to a process for the manufacture of these high solids slurries.

This invention is useful for the manufacture of high solids slurries of structured clay materials, especially calcined kaolin clay. By the term "structured clay materials", we mean kaolin clay materials which have been modified by either chemical or thermal treatment.

Specific examples of chemically-modified clay materials are the kaolin materials disclosed in Shi et al. U.S. Pat. 5,089,056 and the zeolite materials disclosed in Wason U.S. Pat. 4,812,299. Specific examples of thermally-modified clay materials are the calcined kaolin day materials described in Fanselow et al. U.S. Pat. 3,586,523.

Therefore, although a preferred material for this invention is calcined kaolin clay, this invention is applicable to other structured kaolin clay materials.

BACKGROUND OF THE INVENTION

Kaolin is a naturally occurring, relatively fine, white clay which may be generally described as a hydrated aluminum silicate. Kaolin clay is widely used as a filler and pigment in various materials, such as rubber and resins, and in various coatings, such as paints and coatings for paper.

The use of kaolin clay in paper coatings serves, for example, to improve the opacity of the coated paper. Opacity in such paper coatings is enhanced by the light scattering ability of the kaolin clay, and such ability can be estimated by the scattering coefficient as described in TAPPI, 1978, Vol. 61, No. 6, pages 78–80.

Calcined kaolin is a particular type of kaolin clay and is often used in large quantities for paper manufacture. Calcined kaolin can be obtained by heating beneficiated kaolin clay at temperatures of at least 600° C. Calcined kaolin has improved light scattering characteristics (as compared to the non-calcined kaolin) and, therefore, contributes a higher degree of opacity to the paper coating. If kaolin clay is dehydrated by calcination, the calcined kaolin clay will not return to its naturally occurring hydrated form upon contact with water, but will retain its new characteristics.

As large quantities of calcined kaolin clay are often used in the paper and other industries, the transportation of such material to the customer is the subject of considerable effort. At present, calcined kaolin clay is commonly shipped as either a dry powder or an aqueous slurry having a solids content of 48–52%, by weight.

High solids slurries of calcined kaolin clay are desirable because tank cars and trucks could then be used for bulk shipments to increase cost effectiveness. However, calcined kaolin clay is dilatant in slurry form and, therefore, only moderate solids levels have previously been achieved on a commercial scale (i.e., 48–52% solids).

At moderate solids levels, two problems are frequently encountered with calcined kaolin clay slurries. First, settling occurs when these slurries are permitted to stand without agitation. Second, the rheology of these slurries can result in slurries which are too dilatant (i.e., too viscous) to be pumped by conventional means from tank cars or trucks.

High solids slurries of calcined kaolin clay are also desirable in paper manufacturing because increased coating solids, improved dryer efficiencies, improved coating properties and other advantages can be achieved.

Several methods have been proposed to provide high solids calcined kaolin slurries. For example, U.S. Pat. No. 3,754,712 subjects a suspension of calcined kaolin to wet-milling during which increments of calcined kaolin are added to the suspension until the desired high solids content is produced.

U.S. Pat. No. 4,017,324 provides an aqueous slurry of calcined clay and hydrated clay in which the total clay content is about 50–75%, by weight.

U.S. Pat. No. 4,118,245 provides a method for preparing stable high solids slurries of calcined kaolin clay in which a non-stick grinding medium is used.

U.S. Pat. No. 4,118,246 provides a stable high solids slurry of calcined clay through the use of one or more micromixers.

U.S. Pat. No. 4,374,203 provides a stable calcined clay slurry in which anionic and cationic polymers are present in the slurry.

However, for various reasons, the prior art fails to provide an acceptable process for producing high solids calcined kaolin slurries in which the rheological properties of the calcined clay slurries are improved and the opacifying properties are retained. Therefore, a need exists in the kaolin industry for this type of process.

SUMMARY OF THE INVENTION

Briefly described, the present invention provides a high solids slurry of a structured kaolin clay material. More specifically, this invention provides a process for the manufacture of a high solids structured kaolin clay slurry which has improved high shear rheological properties and which uses a lithium-based dispersant for the structured kaolin clay particles.

The process of this invention may be generally described as sequentially (1) forming a substantially uniform aqueous composition of water and a lithium-based compound which will function as a dispersant for structured kaolin clay particles and (2) mixing the structured kaolin clay particles with the aqueous composition until the structured kaolin clay particles are substantially dispersed and until a substantially homogeneous high solids slurry is obtained. The resulting slurry product has improved high shear rheological properties. As an additional benefit of this invention, the resulting slurry product has good opacifying characteristics.

The use of a lithium-based dispersant and the sequence of steps in the above-described process are critical in order to obtain the improved slurry of this invention.

The process of this invention allows for optional steps. During the formation of the aqueous composition, for example, an additional dispersant or a thickening agent, wetting agent or pH adjusting agent, or mixtures thereof, can be mixed with the aqueous composition to aid in formation or maintenance of the slurry.

The present invention provides a high solids structured kaolin clay slurry which can be handled and transported by various means, including tank cars and trucks, due to the rheological properties of the slurry. In this application, the term "rheological properties" refers to the viscosity or flow characteristics of the slurry.

Additionally, the slurry produced by this invention can be used in applications when opacity is a desired feature, because the slurry product has good opacifying characteristics. Thus, the slurry is especially useful in paper coating applications and in formulations for paints and resins.

Accordingly, an object of this invention is to provide a structured kaolin clay slurry having a high solids content.

Another object of this invention is to provide a calcined kaolin clay slurry having a high solids content.

Another object of this invention is to provide a high solids structured kaolin clay slurry having improved high shear rheological properties.

Another object of this invention is to provide a high solids structured kaolin clay slurry having good opacifying properties.

Another object of this invention is to provide a high solids structured kaolin clay slurry in which a lithium-based dispersant is used to disperse the kaolin clay particles.

A further object of this invention is to provide a process for manufacturing a high solids structured kaolin clay slurry.

A further object of this invention is to provide a process for manufacturing a calcined kaolin clay slurry having a high solids content.

A still further object of this invention is to provide a process for manufacturing a high solids structured kaolin clay slurry having improved rheological properties and good opacifying properties.

A still further object of this invention is to provide a process for manufacturing a high solids structured kaolin clay slurry in which a lithium-based dispersant is used to disperse the kaolin clay particles.

A still further object of this invention is to provide a high solids structured kaolin clay slurry which can be handled by conventional means and transported by various means, such as tank cars and trucks.

These and other objects, features and advantages of this invention will become apparent from the following detailed description.

DETAILED DESCRIPTION OF THE INVENTION

In accordance with the present invention, high solids slurries of structured kaolin clay materials are manufactured by a process in which sequential steps are employed. In a preferred embodiment of this invention, an additional dispersant and/or one or more additives (e.g., thickening agents, pH adjusting agents, wetting agents, etc.) are added during the process.

In many instances, the following detailed description of this invention will refer to calcined kaolin clay, a preferred structured clay material for use in this invention.

For purposes of this invention, the term "high solids" refers to those slurries in which the content of structured kaolin clay material is at least 50%, by weight.

With the process of this invention, slurries having from about 55-65% structured kaolin clay, by weight, can be obtained. An especially preferred slurry manufactured in accordance with this invention contains from about 58-64% structured kaolin clay, by weight.

In this invention, we have discovered that a lithium-based dispersant and certain sequential mixing steps can be effectively used to manufacture a high solids structured kaolin clay slurry having improved high shear rheological properties and good opacifying characteristics. By the term "improved rheological properties," we mean that the flow characteristics of our slurry (1) are improved over the flow characteristics of a conventional structured kaolin clay slurry when the two slurries are compared at equivalent solids and (2) are such that our slurry can be worked and/or pumped by means which are conventional in the kaolin industry, depending on the desired use of the slurry. Additionally, by the term "good opacifying characteristics," we mean that the slurry of this invention can be effectively used in those applications when opacity is a desired feature, such as in paints and paper coatings.

This invention preferably uses calcined kaolin clay as a starting material. Calcined kaolin clay can be manufactured by conventional processes, such as disclosed in Fanselow et al. U.S. Pat. 3,586,523.

In the first step of this invention, a substantially uniform aqueous composition of water, lithium-based dispersant and any additives (optional) is formed by mixing. Equipment and mixing conditions (e.g., time, shaft speed, blade tip speed, shaft rpm, etc.) conventional in the kaolin industry can be used for the first mixing step. To achieve and maintain a substantially uniform aqueous composition, the mixing equipment preferably is operated at a shaft speed which will maintain a vortex in the composition.

An essential feature of this invention is the use of a lithium-based dispersant to disperse the structured kaolin clay particles. Examples of preferred lithium-based compounds are lithium phosphates, lithium silicates, lithium salts of polyacrylic acids and mixtures of such compounds. Examples of preferred mixtures are (a) lithium polyacrylate and lithium phosphate and (b) lithium polyacrylate, lithium phosphate and lithium silicate.

The current use in the kaolin clay industry of sodium-based polyacrylate dispersants results in the production of high solids slurries which have a Hercules high shear viscosity in the range of about 400-1200 centipoises. While this viscosity range is acceptable for certain uses of the slurry, an improved high shear viscosity would open new uses for these high solids slurries.

High solids structured kaolin clay slurries manufactured by the process of this invention have Hercules high shear viscosities as low as about 9 centipoises, with the makedown procedure being otherwise the same as with the slurries containing a conventional sodium-based dispersant.

The first mixing step will be operated for a time sufficient to obtain a substantially uniform aqueous composition. This mixing step is terminated when a substantially uniform aqueous composition is obtained, which may be determined by extraction, testing and/or observation of a sample. Generally, this mixing step will be operated for at least 5-10 minutes.

Thickening agents, pH adjusting agents, wetting agents or mixtures thereof can be effectively used during the first mixing step to obtain various effects.

Suitable thickening agents include sodium carboxymethylcellulose, xanthan gum (sold under the trademark Kelzan by Merck & Co., Kelco Division) and compounds sold under the trademarks Aqualon AQUD 3204 and 3262A by Aqualon Co. (a division of Hercules, Inc.). Preferred thickening agents are sodium carboxymethylcellulose and the above-described xanthan gum.

Suitable pH modifiers include sodium carbonate, sodium hydroxide, lithium hydroxide, lithium carbonate, ammonium hydroxide and potassium hydroxide. Preferred pH modifiers are sodium carbonate, sodium hydroxide and lithium hydroxide. While the use of pH modifiers is not required, these compounds can be effectively used to achieve a slurry pH of from about 5–10, preferably about 6–8, for use of the slurry in the paper coating industry.

Suitable wetting agents include sodium lauryl sulfate, sodium dioctylsulphosuccinate, polyoxyethylene sorbitan monolaurate, fatty amine ethoxylate, long chain amine acids and long chain substituted betaine. Preferred wetting agents are non-ionic ethers, non-ionic esters, sodium dioctylsulphosuccinate, polyoxyethylene sorbitan monolaurate and the long chain amine acids.

If used, these additives are used in amounts which are conventional in the kaolin industry.

After a substantially uniform aqueous composition is obtained, structured kaolin clay particles are mixed with the aqueous composition for a time which is sufficient to substantially disperse the structured kaolin clay particles and to obtain a substantially homogeneous high solids slurry. The maximum mixing time for this second mixing step will depend upon the rheological characteristics which are desired for the final slurry product. In general, we have found that extended mixing may continue to provide improved product rheology, but such extended mixing may adversely affect the opacifying characteristics of the final slurry product. In general, however, this second mixing step will continue for a time period of at least 5–10 minutes.

The total mixing time for the process of this invention may vary from 10–20 minutes to a few hours, depending on the mixing conditions, equipment, quantities, product objectives, etc.

As is true with regard to the first mixing step, equipment and mixing conditions which are conventional in the kaolin industry can be used for the second mixing step.

The final high solids structured kaolin clay slurry of this invention will generally have a pH of from about 5 to about 10, preferably from about 6.0 to about 8.0.

The first and second mixing steps can be operated at ambient temperatures and pressures in the process of this invention. However, in both instances, an increase in temperature may be observed due to the mixing action. In either instance, the mixing container does not have to be jacketed for heating or cooling.

The viscosity (or rheological properties) of the final high solids slurry is determined by the TAPPI T648 om-88 method, using a Hercules high shear viscometer. Preferably, the high solids slurries of this invention will have a final Hercules viscosity (in centipoises) of less than about 400, most preferably less than about 300 centipoises. The upper measurement limit of the Hercules high shear viscometer is 343,800 centipoises.

The opacity (or light scattering ability) of the final high solids slurry is determined by the scattering coefficient, which is measured by the method described in TAPPI, 1978, Vol. 61, No. 6, pages 78–80. Preferably, the slurries of this invention have a scattering coefficient of from about 0.5 to about 1.6, most preferably at least about 0.9.

The present invention is further illustrated by the following examples which are illustrative of certain embodiments designed to teach those of ordinary skill in this art how to practice this invention and to represent the best mode contemplated for carrying out this invention.

EXAMPLES 1–4

Four samples are each made by first mixing water and a dispersant in the amounts as shown in Table I. For Examples 1 and 3, the conventional dispersant sodium polyacrylate is used. For Examples 2 and 4, lithium polyacrylate is used as the dispersant in accordance with this invention.

For Examples 1 and 2, these materials are mixed in a Premier brand mixer equipped with a 1.625 inch Cowles blade. After a substantially uniform aqueous composition is obtained, calcined kaolin clay (in the amount as shown in Table I) is added to the composition with continued mixing. After the addition of the clay material is completed, the resultant slurry is intensely mixed at 8600 rpm for about 3 minutes, after which the mixing is terminated. The slurries of Examples 1 and 2 are then cooled to 80° F. and adjusted with water to a solids content of approximately 50 percent, by weight.

Examples 1 and 2 are checked for high shear viscosity using a Hercules viscometer, and the results are shown in Table I.

For Examples 3 and 4, each slurry is formed by the slow addition of calcined kaolin clay (in the amount as shown in Table I) to the water/dispersant aqueous composition, using mixing equipment having a double propeller-type blade. After the addition of the clay material is completed, the resultant slurry is intensely mixed at approximately 5000 rpm for about 60 minutes using a mixer equipped with a 3 inch Cowles blade, after which the mixing is terminated. The slurries are then cooled to 80° F. and mixed with 1 pound per ton of Kelzan brand xanthan gum (as a 1% solution), which functions as a thickening agent. The slurries of Examples 3 and 4 are then adjusted with water to a solids content of approximately 60 percent, by weight.

Examples 3 and 4 are checked for high shear viscosity using a Hercules viscometer, and the results are shown in Table I.

TABLE 1

| Example | Dispersant Type | Amount of Dispersant* | pH of Slurry | Percent Solids (by wt.) | Hercules High Shear Viscosity (centipoises) |
|---|---|---|---|---|---|
| 1 | Sodium polyacrylate | 1.5 | 7.1 | 50.0 | 904 |
| 2 | Lithium polyacrylate | 0.5 | 7.1 | 50.0 | 8.7 |
| 3 | Sodium polyacrylate | 1.5 | 6.5 | 59.6 | 1074 |

TABLE 1-continued

| Example | Dispersant Type | Amount of Dispersant* | pH of Slurry | Percent Solids (by wt.) | Hercules High Shear Viscosity (centipoises) |
| --- | --- | --- | --- | --- | --- |
| 4 | Lithium polyacrylate | 0.25 | 6.5 | 60.0 | 366 |

*pounds of dispersant per ton of calcined kaolin clay

The above results show that the use of a conventional sodium-based dispersant, at both solids levels, produces slurries with higher viscosities than the lithium-based dispersant utilized by the present invention. Additionally, the lithium-based dispersants of this invention produce slurries with improved rheology at lower levels of dispersants.

EXAMPLES 5-8

The procedure used for Examples 1-4 is repeated to obtain four additional samples. For Examples 5 and 7, the conventional dispersant sodium polyacrylate is used. For Examples 6 and 8, lithium polyacrylate is used as the dispersant in accordance with this invention. The percent solids are adjusted to 50.0 for Examples 5 and 6 and to 60.0 for Examples 7 and 8.

The scattering coefficient for each sample is determined as described above, and the results are shown in Table 2.

TABLE 2

| Example | Dispersant Type | Amount of Dispersant* | pH of Slurry | Scattering Coefficient | Hercules High Shear Viscosity (centipoises) |
| --- | --- | --- | --- | --- | --- |
| 5 | Sodium polyacrylate | 1.5 | 6.7 | 1.26 | 603 |
| 6 | Lithium polyacrylate | 0.5 | 7.1 | 1.22 | 9 |
| 7 | Sodium polyacrylate | 1.5 | 6.7 | 0.95 | 502 |
| 8 | Lithium polyacrylate | 0.5 | 7.1 | 1.00 | 17 |

*pounds of dispersant per ton of calcined kaolin clay

The above results show that use of a lithium-based dispersant, at both solids levels, produces slurries with scattering coefficients which are acceptable and equivalent to those obtained with slurries made with a conventional sodium-based dispersant.

This invention has been described in detail with particular reference to certain embodiments, but variations and modifications can be made without departing from the spirit and scope of the invention as defined in the following claims.

What is claimed is:

1. A process for the manufacture of a high solids slurry of a structured kaolin clay material, wherein the process comprises the sequential steps of:
   A. forming an aqueous composition by mixing water and a lithium dispersant for a time which is sufficient to obtain a substantially uniform aqueous composition; and
   B. mixing structured kaolin clay particles with the aqueous composition for a time which is sufficient to substantially disperse the kaolin clay particles and to obtain a substantially homogeneous high solids slurry;
   wherein the high solids slurry has improved high shear rheological properties.

2. A process as defined by claim 1 wherein the kaolin clay material is calcined kaolin clay.

3. A process as defined by claim 1 wherein the lithium dispersant is lithium polyacrylate.

4. A process as defined by claim 1 wherein the lithium dispersant is lithium silicate.

5. A process as defined by claim 1 wherein the dispersant is lithium phosphate.

6. A process as defined by claim 1 wherein the dispersant is a mixture of lithium polyacrylate and lithium phosphate.

7. A process as defined by claim 1 wherein the dispersant is a mixture of lithium polyacrylate, lithium phosphate and lithium silicate.

8. A process as defined by claim 1 wherein the total mixing time is at least 10 minutes.

9. A process as defined by claim 1 wherein the Hercules viscosity of the high solids slurry is less than about 400 centipoises.

10. A process as defined by claim 1 wherein the Hercules viscosity of the high solids slurry is less than about 300 centipoises.

11. A process as defined by claim 1 wherein the content of structured kaolin clay in the slurry is at least 50%, by weight.

12. A high solids structured kaolin clay slurry manufactured by a process which comprises the sequential steps of:
   A. forming an aqueous composition by mixing water and a lithium dispersant for a time which is sufficient to obtain a substantially uniform aqueous composition; and
   B. mixing structured kaolin clay particles with the aqueous composition for a time which is sufficient to substantially disperse the structured kaolin clay particles and to obtain a substantially homogeneous high solids slurry;
   wherein the high solids slurry has improved high shear rheological properties and where in the content of structured kaolin clay in the slurry is at least 50% by weight.

13. A high solids kaolin clay slurry as defined by claim 12 wherein the kaolin clay material is calcined kaolin clay.

14. A high solids kaolin clay slurry as defined by claim 12 wherein the lithium dispersant is lithium polyacrylate.

15. A high solids kaolin clay slurry as defined by claim 12 wherein the dispersant is lithium silicate.

16. A high solids kaolin clay slurry as defined by claim 12 wherein the lithium dispersant is lithium phosphate.

17. A high solids kaolin clay slurry as defined by claim 12 wherein the lithium dispersant is a mixture of lithium polyacrylate and lithium phosphate.

18. A high solids kaolin clay slurry as defined by claim 12 wherein the lithium dispersant is a mixture of lithium polyacrylate, lithium phosphate and lithium silicate.

19. A high solids kaolin clay slurry as defined by claim 12 wherein the total mixing time is at least 10 minutes.

20. A high solids kaolin clay slurry as defined by claim 12 wherein the Hercules viscosity of the high solids slurry is less than 400 centipoises.

21. A high solids kaolin clay slurry as defined by claim 12 wherein the Hercules viscosity of the high solids slurry is less than 300 centipoises.

* * * * *